A. B. RASMUSSEN.
OIL GAUGE.
APPLICATION FILED JULY 13, 1921.
1,407,220.
Patented Feb. 21, 1922.
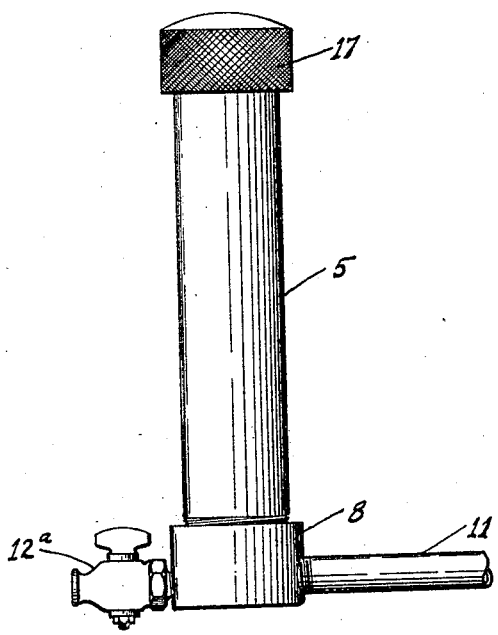
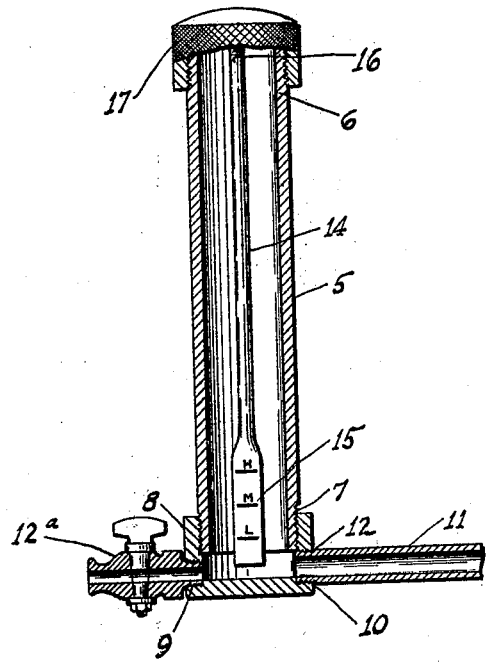
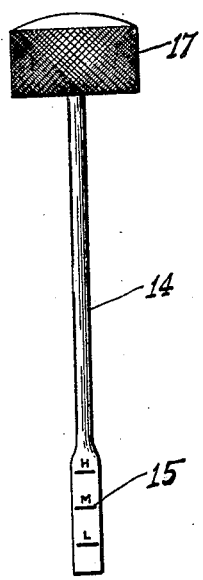
Inventor
A. B. Rasmussen
By Watson E. Coleman Attorney

UNITED STATES PATENT OFFICE.

ALFRED B. RASMUSSEN, OF WALNUT, IOWA.

OIL GAUGE.

1,407,220. Specification of Letters Patent. Patented Feb. 21, 1922.

Application filed July 13, 1921. Serial No. 484,476.

*To all whom it may concern:*

Be it known that I, ALFRED B. RASMUSSEN, a citizen of the United States, residing at Walnut, in the county of Pottawattamie and State of Iowa, have invented certain new and useful Improvements in Oil Gauges, of which the following is a specification, reference being had to the accompanying drawings.

This invention relates to gauges and particularly to an oil gauge for automobiles.

It is an object of the invention to provide an oil gauge of this character which is "fool proof" in that it is capable of indicating the exact quantity of oil within the crank case of the engine without providing means for disposing the oil within the gauge above the level of the oil within the crank case of the engine.

It is another object of the invention to provide a gauge of this character wherein the level of the oil within the gauge corresponds to the level of the oil within the crank case, so that the exact amount of oil may always be obtained.

It is more particularly the object of the invention to provide a gauge of this character wherein the gauge may be drained and means inserted not only through the draining means, but through the conduit leading to the crank case for cleaning said conduit to remove sediment and prevent clogging.

It is a further object of the invention to provide a gauge of this character including a measuring rod, said rod having a cap on one end adapted to be connected to the gauge to prevent the entrance of foreign matter.

With these and other objects in view, the invention consists in the improved construction and arrangement of parts to be hereinafter more particularly described, fully claimed and illustrated in the accompanying drawings, in which :—

Figure 1 is a view in elevation of an oil gauge constructed in accordance with an embodiment of the invention, Figure 2 is a longitudinal sectional view, and Figure 3 is a view in elevation of the measuring rod and cap.

Referring to the drawings, 5 designates a tubular member which forms the body of the gauge. This member may be made of any suitable material, as it is not necessary that it be transparent. The upper end 6 of the tubular member is exteriorly threaded. The lower end 7 is also exteriorly threaded and adapted to engage a cap 8. The cap is interiorly threaded and provided with substantially opposed openings 9 and 10, the opening 9 being smaller in diameter than the opening 10.

A conduit 11 has its end 12 threaded in the opening 10, the opposite end of the conduit leading to and extending through the wall of the crank case (not shown) adjacent the bottom of the crank case so as to receive the oil at the lowest possible point. In this way, oil passes through the conduit and into the tubular member 5 and extends upwardly in the tubular member until it reaches a level corresponding to the level of the oil within the crank case. A pet cock 12ª is threaded in the opening 9, said pet cock having a valve 13 adapted to be operated to permit draining of the tubular member as well as the conduit 11. Another important feature of the pet cock is that when the valve is disposed in its open position, it cooperates with the opening 10 to provide an unobstructed passage through the conduit 11 to permit the insertion of a piece of wire or brush for the purpose of cleaning not only the lower portion of the tubular member 5, but the conduit to remove sediment and prevent the conduit as well as the tubular member from clogging and interfering with the accuracy of the gauge in addition to providing another means for draining the crank case.

In order to ascertain the quantity of oil within the crank case, a novel form of measuring rod 14 is provided, the lower end portion of which is enlarged and provided with a series of markings 15 adapted to indicate the level of the oil. These markings are designated high, medium and low. The upper end 16 of the rod is connected to a cap 17, said cap being internally threaded for engagement with the exteriorly threaded portion of the tubular member 5. The periphery of the cap 17 is knurled so as to permit the operator to readily apply and remove the same. Through the medium of the cap, the measuring rod is suspended centrally of the tubular member 5, the enlarged portion of the rod terminating in spaced relation to the cap 8 and below the lower end of the tubular member.

The tubular member may be located at any convenient point adjacent the driver's seat, for instance, it may be disposed or connected to the dash board or adjacent the front of the driver's seat, as the conduit 11 may be made in various lengths. To ascertain the quantity of oil within the crank case, it is only necessary to rotate the cap 17 so as to disconnect the rod from the tubular member 5. As the enlarged portion of the rod is disposed within the oil, the level of the oil will be accurately registered on the enlarged portion so that the operator can tell the quantity of oil by the portion of the rod coated with oil.

From the foregoing it will be readily seen that this invention provides a novel form of oil gauge which in view of its simplicity may be readily applied to the crank case of any type of automobile and wherein the quantity of oil may be ascertained in the most practical manner. In addition to this, it provides means for cleaning the lower portion of the gauge so as to prevent sediment from interfering with the passage of oil through the conduit and into the gauge.

Furthermore, the gauge will last indefinitely as the tubular member 5 can be constructed of metal.

What is claimed is:—

An oil gauge of the character described comprising a socket member having opposed ports in its side wall, an outlet member disposed in one of said ports, an inlet member disposed in the opposite port, the inner wall of said socket member above the ports being threaded, a tubular member having exteriorly threaded ends, one end of said member being screwed in the socket member, an internally threaded cap engaged with the opposite threaded end of the tubular member, and a rod carried by and depending from the top of the cap, said rod being disposed within the tubular member and having one end flattened and positioned in spaced relation to the bottom of the socket member.

In testimony whereof I hereunto affix my signature.

ALFRED B. RASMUSSEN.